United States Patent
Lee et al.

(10) Patent No.: US 9,036,098 B2
(45) Date of Patent: May 19, 2015

(54) LIQUID CRYSTAL DISPLAY DEVICE AND METHOD FOR MANUFACTURING THE SAME

(75) Inventors: YoungNam Lee, Paju-si (KR); JooHong Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 96 days.

(21) Appl. No.: 13/193,920

(22) Filed: Jul. 29, 2011

(65) Prior Publication Data

US 2012/0026433 A1    Feb. 2, 2012

(30) Foreign Application Priority Data

Aug. 2, 2010    (KR) .................. 10-2010-0074653

(51) Int. Cl.
| | | |
|---|---|---|
| G02F 1/1335 | (2006.01) | |
| G02F 1/1333 | (2006.01) | |
| G02B 27/26 | (2006.01) | |
| H04N 13/04 | (2006.01) | |

(52) U.S. Cl.
CPC .... G02B 27/26 (2013.01); *G02F 2001/133331* (2013.01); G02F 1/133528 (2013.01); *G02F 2001/133538* (2013.01); *G02F 2001/133541* (2013.01); *G02F 2001/133562* (2013.01); *H04N 13/0434* (2013.01); *H04N 2213/001* (2013.01)

(58) Field of Classification Search
CPC .............................................. G02F 2001/13331
USPC .............................. 349/15, 96, 98, 58
See application file for complete search history.

(56) References Cited

U.S. PATENT DOCUMENTS

| | | | | |
|---|---|---|---|---|
| 5,805,250 | A * | 9/1998 | Hatano et al. ................... 349/96 |
| 6,977,774 | B1 * | 12/2005 | Kawakami et al. ...... 359/485.03 |
| 7,542,105 | B2 * | 6/2009 | Sato et al. ....................... 349/58 |
| 8,792,252 | B2 * | 7/2014 | Hwang et al. ................. 361/807 |
| 2008/0136995 | A1 * | 6/2008 | Oohira ............................ 349/58 |
| 2008/0261057 | A1 * | 10/2008 | Slobodin ...................... 428/447 |
| 2010/0149462 | A1 * | 6/2010 | Nishino et al. ................ 349/102 |
| 2010/0265425 | A1 * | 10/2010 | Kawaguchi et al. ............ 349/58 |

* cited by examiner

*Primary Examiner* — Edward Glick
*Assistant Examiner* — Mark Teets
(74) *Attorney, Agent, or Firm* — McKenna Long & Aldridge LLP

(57) ABSTRACT

Disclosed is a liquid crystal display (LCD) device that facilitates the display of 3D images. The LCD device comprises a liquid crystal panel an upper substrate for a color filter array, a lower substrate for a TFT array, and a liquid crystal layer between the lower and upper substrates; a guide panel placed on the liquid crystal panel; a bottom cover extended to a height of an upper surface of the liquid crystal panel, the bottom cover covering lateral sides of the liquid crystal panel; a tempered polarizing glass having a plurality of polarizing patterns to circularly polarize light emitted from the liquid crystal panel leftward or rightward, the tempered polarizing glass placed on the upper surfaces of the liquid crystal panel and the bottom cover; and an adhesive layer on the upper surfaces of the liquid crystal panel and the bottom cover.

10 Claims, 6 Drawing Sheets

LIQUID CRYSTAL DISPLAY DEVICE AND METHOD FOR MANUFACTURING THE SAME

CROSS REFERENCE TO RELATED APPLICATIONS

This application claims the benefit of the Korean Patent Application No. 10-2010-0074653 filed on Aug. 2, 2010, which is hereby incorporated by reference as if fully set forth herein.

BACKGROUND OF THE INVENTION

1. Field of the Invention

The present invention relates to a display device, and more particularly, to a borderless type three-dimensional (3D) liquid crystal display (LCD) device which facilitates to display 3D images and to enhance a sense of beauty.

2. Discussion of the Related Art

A display device has been continuously developed to satisfy various requirements such as large-sized screen and thin profile. Especially, there is the explosive increase in flat type display devices having advantages of thin profile, lightness in weight, and low power consumption.

The flat type display device may include a liquid crystal display device (LCD), a plasma display panel (PDP), a field emission display device (FED), a light-emitting diode display device (LED), and etc.

Among the various flat panel display devices, the LCD device is widely used owing to various advantages, for example, technical development for the mass production, easiness of driving means, low power consumption, and high-quality resolution.

The LCD device comprises a liquid crystal panel with a plurality of liquid crystal cells (pixels) arranged in a matrix configuration; and a driving circuit for driving the liquid crystal panel. As light transmittance is adjusted pixel-by-pixel in accordance with an input video signal, an image is displayed on the LCD device.

There are the plural liquid crystal cells defined by crossing a plurality of gate lines and a plurality of data lines of the liquid crystal panel. Each liquid crystal cell is provided with pixel electrode and common electrode for applying an electric field. Each of the liquid crystal cells is switched via a thin film transistor (TFT).

The driving circuit includes a gate driver, a data driver, a timing controller, a common voltage supplier, and a backlight driver.

The timing controller generates a gate control signal in accordance with an input clock signal, and supplies the generated gate control signal to the gate driver. Also, the timing controller generates a data control signal in accordance with the input clock signal, and supplies the generated data control signal to the data driver. In addition, the timing controller aligns the input video signal to digital video data, and then supplies the aligned digital video data to the data driver.

The gate driver generates a scan signal in accordance with the gate control signal supplied from the timing controller, and supplies the generated scan signal to the gate lines.

The data driver converts the digital video data into an analog data voltage in accordance with the data control signal supplied from the timing controller, and supplies the analog data voltage to the data lines.

The common voltage supplier supplies a common voltage (Vcom) to the liquid crystal cell.

The backlight driver drives a light source (backlight) for supplying light to the liquid crystal panel.

In the LCD device, an alignment of liquid crystal is changed depending on a voltage formed between the pixel electrode and the common electrode pixel-by-pixel. Thus, transmittance of light emitted from the backlight unit can be controlled through the alignment of liquid crystal, to thereby display the image.

Recently, a user's demand for a stereoscopic image is rapidly increased so that an LCD device capable of displaying 3D (3-dimensional) image as well as 2D (2-dimensional) image is actively developed.

The LCD device displaying 3D image can realize the 3D image through a difference in viewing between both eyes of the user (binocular parallax display).

There have been proposed a shutter glass method using stereoscopic glasses, and a patterned retarder method using polarizing glasses.

FIG. 1 illustrates a method of realizing 3D image by the use of shutter glass according to the related art.

Referring to FIG. 1, the method of realizing 3D image by the use of shutter glass according to the related art is to use the user's binocular parallax.

After 2D left image and 2D right image, which are different from each other, are respectively viewed by the left and right eyes of the user, two of the 2D images are integrated so that the integrated image is discerned as the 3D image by the user.

For this, a liquid crystal panel 10 separately displays 2D images for the left viewing and right viewing with a difference in time. In this case, rising or falling of liquid crystal is not completely finished for a preset period of time (frame) due to slow response speed of liquid crystal. Thus, luminance may be not uniform between lower and upper end portions of the liquid crystal panel 10.

Also, since the shutter glass is turned-on/off by the use of liquid crystal, a response speed of the shutter glass becomes slow. Thus, even though the shutter glass is turned-off at an end point of a vertical period of 1 frame, the shutter glass is not completely closed until when image data is displayed on the upper end portion of the liquid crystal panel.

Accordingly, there is the difference in response speed of liquid crystal between the lower and upper end portions of the liquid crystal panel. Also, the left image and right images are not separated from each other together with the luminance nonuniformity, that is, crosstalk occurs, thereby deteriorating the picture quality of 3D image. If the user watches the 3D image with the crosstalk occurrence for a long time, the user is liable to feel dizzy.

FIG. 2 illustrates an LCD device of patterned retarder method using polarizing glasses according to the related art.

Referring to FIG. 2, an LCD device of patterned retarder method includes a liquid crystal panel 10 for displaying an image; and a patterned retarder layer which enables the user to discern 3D image by patterned-retarding the image displayed on the liquid crystal panel 10.

The liquid crystal panel 10 includes lower and upper substrates confronting each other with a liquid crystal layer interposed therebetween. A lower polarizing plate (lower polarizing film) 12 is positioned at a lower side of the liquid crystal panel 10, and an upper polarizing plate (lower polarizing film) 14 is positioned at an upper side of the liquid crystal panel 10.

The patterned retarder layer retards the image displayed on the liquid crystal panel 10. The patterned retarder layer includes a transparent glass 20; first and second polarizers 24 and 26 formed under the transparent glass 20, wherein the first and second polarizers 24 and 26 circularly polarize light leftward or rightward; and a black matrix 22 for blocking the light.

The patterned retarder layer displays the left image by retarding the leftward circularly polarized light which is emitted from the pixels corresponding to the half of all pixels included in the liquid crystal panel 10 through the first polarizer 24. For example, the first polarizer 24 may leftward circularly polarize the light which is emitted from the pixels in the odd-numbered lines of the liquid crystal panel 10.

Also, the patterned retarder layer displays the right image by retarding the rightward circularly polarized light which is emitted from the pixels corresponding to the other half of all pixels included in the liquid crystal panel 10 through the second polarizer 26. For example, the second polarizer 26 may rightward circularly polarize the light which is emitted from the pixels in the even-numbered lines of the liquid crystal panel 10.

Thus, the user discerns the 3D image by the left image and the right image separately displayed.

The related art LCD device satisfies the user's functional requirement by displaying the 3D image in the above shutter glass method and patterned retarder method.

Recent research is particularly required on design of the LCD device to satisfy the sense of beauty as well as the function requirement.

Consequently, efforts for minimizing the thicknesses (slimness) of LCD devices are continuously being made, and research is being conducted on a design with enhanced sense of beauty that can induce consumers to buy by appealing to consumers' sense of beauty.

For example, a borderless type LCD device for minimizing the border area and step difference has been researched and studied.

FIG. 3 illustrates a borderless type LCD device according to the related art.

Referring to FIG. 3, the borderless type LCD device according to the related art includes a liquid crystal panel 10 for displaying an image; a guide panel 16 on which the liquid crystal panel 10 is placed; a bottom cover 18 having a vertical part and an extended part, wherein the vertical part covers lateral sides of the liquid crystal panel 10, and the extended part covers a predetermined portion of an upper side of the liquid crystal panel 10; and a tempered glass 30 provided on the bottom cover 18.

In this case, a lower polarizing plate 12 is provided on a lower surface of the liquid crystal panel 10, and an upper polarizing plate 14 is provided on an upper surface of the liquid crystal panel 10.

In the borderless type LCD device according to the related art, the tempered glass 30 is provided on the extended part of the bottom cover 18 for covering the upper edge of the liquid crystal panel 10. Then, the bottom cover 18 and the tempered glass 30 are bonded to each other by an adhesive 32.

For viewing the LCD device, the consumer's requirement for the sense of beauty may be satisfied to some extent owing to the minimized border area and step difference.

However, as shown in FIG. 3, the tempered glass 30 is provided on the extended part of the bottom cover 18 for covering the lateral sides and the predetermined portion of the upper side of the liquid crystal panel 10, there is an air gap between the liquid crystal panel 10 and the tempered glass 30.

The borderless type LCD device according to the related art may have phase retardation due to the difference in refraction by the air gap between the liquid crystal panel 10 and the tempered glass 30. Thus, light being emitted from the liquid crystal panel 10 and being incident on the tempered glass 30 is changed in its phase, whereby the display image is distorted.

In order to display the 3D image on the borderless type LCD device, a patterned retarder layer should be additionally formed on the liquid crystal panel 10, thereby causing the complicated manufacturing process and the increased manufacturing cost.

For avoiding the above problems of the patterned retarder method, the shutter glass method may be used. However, in case of the shutter glass method, the increase of cost is unavoidable due to the shutter glasses. Also, the picture quality of display image may be deteriorated by the above crosstalk.

SUMMARY OF THE INVENTION

Accordingly, the present invention is directed to an LCD device and a method for manufacturing the same that substantially obviates one or more problems due to limitations and disadvantages of the related art.

An aspect of the present invention is to provide a borderless type LCD device which facilitates to display 3D image.

Another aspect of the present invention is to provide a borderless type 3D LCD device which facilitates to reduce a manufacturing cost.

Another aspect of the present invention is to provide a borderless type 3D LCD device which facilitates to improve picture quality of display image.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device comprising: a liquid crystal panel which includes an upper substrate for a color filter array, a lower substrate for a thin film transistor array, and a liquid crystal layer between the lower and upper substrates, wherein the lower and upper substrates are bonded to each other with the liquid crystal layer interposed therebetween; a guide panel which is placed on the liquid crystal panel; a bottom cover which is extended to a height of an upper surface of the liquid crystal panel, the bottom cover covering lateral sides of the liquid crystal panel; a tempered polarizing glass which includes a plurality of polarizing patterns to circularly polarize light emitted from the liquid crystal panel leftward or rightward, the tempered polarizing glass placed on the upper surfaces of the liquid crystal panel and the bottom cover; and an adhesive layer for fixing the tempered polarizing glass, the adhesive layer formed on the upper surfaces of the liquid crystal panel and the bottom cover.

In another aspect of the present invention, there is provided a method for manufacturing an LCD device comprising: manufacturing a liquid crystal panel by bonding an upper substrate for a color filter array and a lower substrate for a thin film transistor array to each other with a liquid crystal layer interposed therebetween; manufacturing a tempered polarizing glass by forming first and second polarizing patterns whose phase retardation axes are different by 90°, wherein the first and second polarizing patterns are formed by forming an optical alignment film on a tempered glass substrate, and aligning the optical alignment film at first and second directions, respectively; placing the liquid crystal panel on a guide panel, and forming a bottom cover extended to a height of an upper surface of the liquid crystal panel, the bottom cover covering lateral sides of the liquid crystal panel; forming an adhesive layer on upper surfaces of the liquid crystal panel and the bottom cover; and adhering the tempered polarizing glass and the liquid crystal panel by the use of adhesive layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 1:
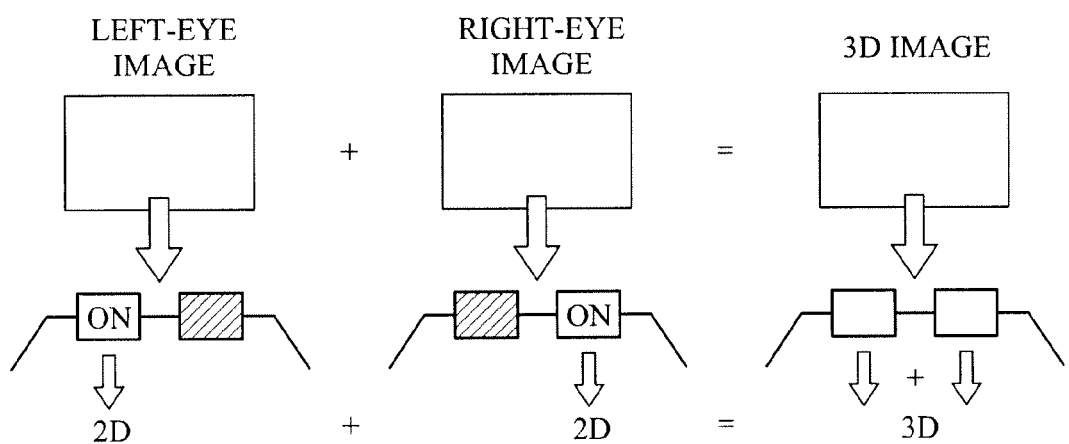
FIG. 1 illustrates a method of realizing 3D image by the use of shutter glasses according to the related art.
Figure 2:
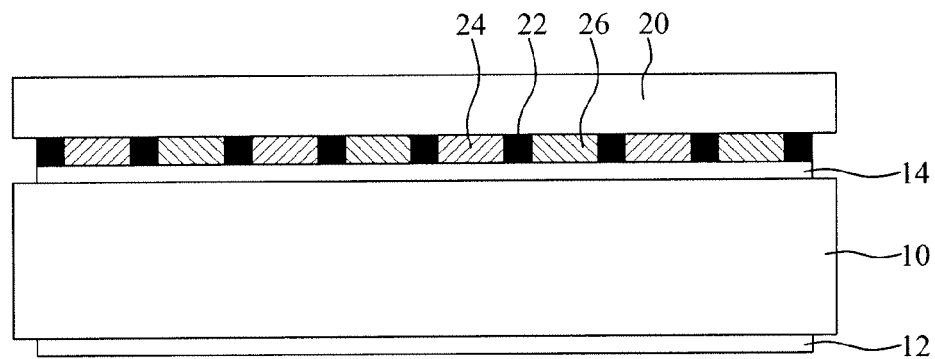
FIG. 2 illustrates an LCD device of patterned retarder method using polarizing glasses according to the related art.
Figure 3:
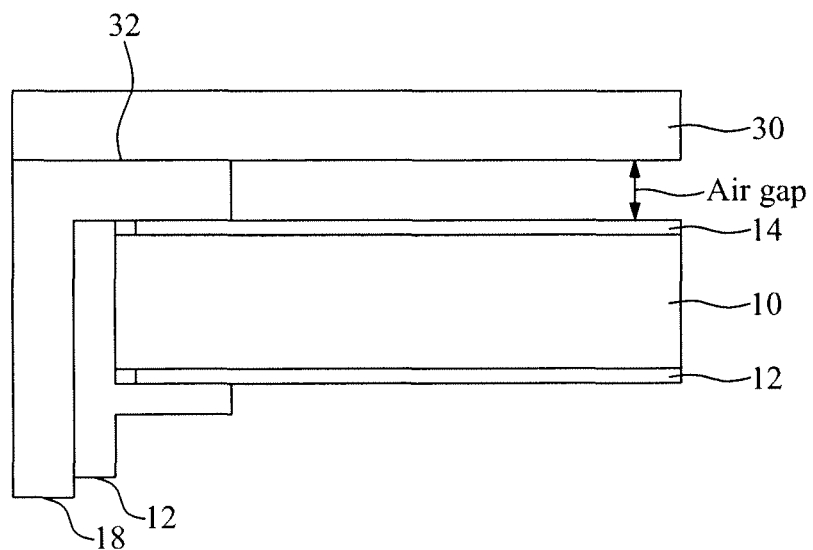
FIG. 3 illustrates an LCD device of borderless type according to the related art.
Figure 4:
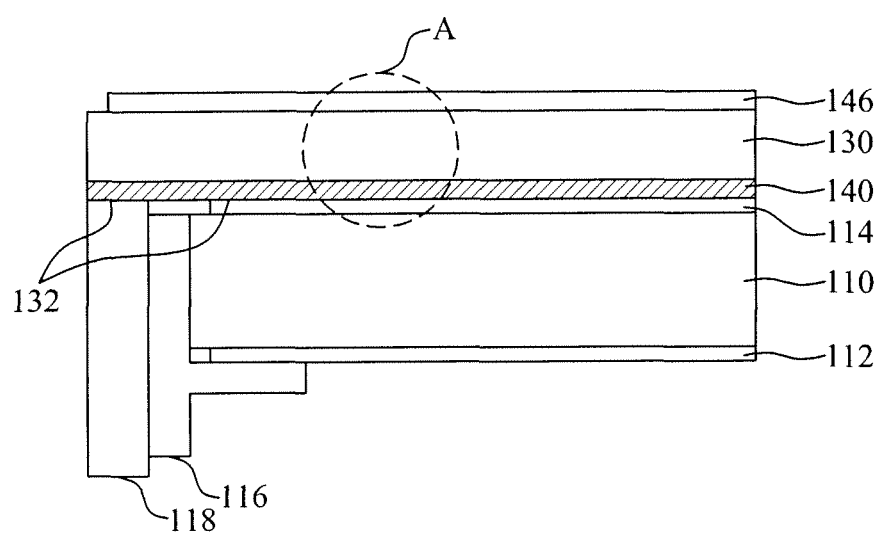
FIG. 4 illustrates an LCD device according to the embodiment of the present invention.
Figure 5:
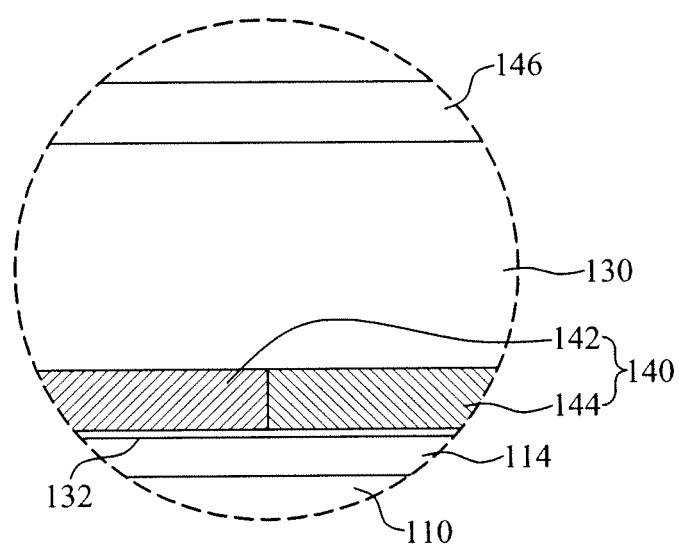
FIG. 5 is an expanded view of 'A' of FIG. 4.

FIG. 4 illustrates an LCD device according to the embodiment of the present invention. FIG. 5 is an expanded view of 'A' of FIG. 4.

Referring to FIGS. 4 and 5, the LCD device according to the embodiment of the present invention includes a liquid crystal panel 110 which displays an image in accordance with an input video signal; a guide panel 116 on which the liquid crystal panel 110 is placed; a bottom cover 118 which covers lateral sides of the guide panel 116 and supports a tempered polarizing glass 130; the tempered polarizing glass 130 which is provided above the liquid crystal panel 110 and the bottom cover 118; and a scattered-reflection film (ARC film) 146 which is provided on the tempered polarizing glass 130.

Although not shown, the LCD device according to the embodiment of the present invention includes a backlight unit which emits light to the liquid crystal panel 110, and a driving circuit which drives the liquid crystal panel 110.

The liquid crystal panel 110 includes a lower substrate, an upper substrate, and a liquid crystal layer, wherein the lower and upper substrates are bonded to each other under the circumstance that the liquid crystal layer is interposed between the lower and upper substrates.

On the lower substrate of the liquid crystal panel 110, there are a plurality of gate lines and data lines. Also, a thin film transistor (TFT) which functions as a switching device is formed every region defined by intersecting the gate and data lines.

On the upper substrate of the liquid crystal panel 110, there are red, green, and blue color filters which filter colored light (R, G, B) from light being incident via the liquid crystal layer, and emit the colored light (R, G, B); and a black matrix (BM) which prevents the mixture of colored light (R, G, B).

A lower polarizing film 112 is formed on a lower surface of the liquid crystal panel 110, and an upper polarizing film 114 is formed on an upper surface of the liquid crystal panel 110.

The lower and upper substrates are formed of transparent glass substrates, wherein each of the lower and upper substrates has 0.7 mm thickness.

The lower polarizing film 112 has 0.175 mm thickness, and the upper polarizing film 114 has 0.18 mm thickness.

The liquid crystal panel 110 is placed on and supported by the guide panel 116. The bottom cover 118 covers the lateral sides of the liquid crystal panel 110.

An upper end of the bottom cover 118 is positioned on the same line as an upper surface of the upper polarizing film 114 of the liquid crystal panel 110. That is, the upper end of the bottom cover 118 is positioned to have the same height as that of the upper surface of the upper polarizing film 114 of the liquid crystal panel 110.

The tempered polarizing glass 130 is placed on the upper end of the bottom cover 118. The bottom cover 118 supports the tempered polarizing glass 130.

An adhesive layer 132 for adhesion (fixing) of the tempered polarizing glass 130 is formed on the upper surface of the bottom cover 118 and the upper surface of the upper polarizing film 114 of the liquid crystal panel 110.

As the tempered polarizing glass 130 is adhered to the liquid crystal panel 110 by the use of adhesive layer 132, an air gap is not generated between the liquid crystal panel 110 and the tempered polarizing glass 130. Thus, it is possible to prevent the display image from being distorted by the air gap, thereby improving picture quality in the borderless type LCD device.

The adhesive layer 132 is formed on the upper surfaces of the bottom cover 118 and the upper polarizing film 114 of the liquid crystal panel 110. According to another embodiment of the present invention, the adhesive layer may be formed on the lower surface of the tempered polarizing glass 130.

The tempered polarizing glass 130 includes a transparent glass substrate, and a polarizing layer (phase retardation layer) under the transparent glass substrate.

The glass substrate of the tempered polarizing glass 130 has 0.7 mm~2.6 mm thickness. The polarizing layer has 0.01 mm~0.001 mm thickness (preferably 0.005 mm).

The polarizing layer includes a plurality of first polarizing patterns 142 for leftward circularly polarizing the light; and a plurality of second polarizing patterns 144 for rightward circularly polarizing the light.

For example, the first polarizing patterns 142 corresponding to the half of all polarizing patterns are formed corresponding to the pixels of odd-numbered lines. The first polarizing patterns 142 leftward circularly polarize the light emitted from the pixels of the odd-numbered lines among all pixels of the liquid crystal panel 110.

The second polarizing patterns 144 corresponding to the other half of all polarizing patterns are formed corresponding to the pixels of even-numbered lines. The second polarizing patterns 144 rightward circularly polarize the light emitted from the pixels of the even-numbered lines among all pixels of the liquid crystal panel 110.

The tempered polarizing glass 130 is formed in a square having a long side of 1061.8 mm±0.2 mm and a short side of 606.8 mm±0.2 mm. In this case, the polarizing layer may be formed in a square having a long side of 1042.93 mm±0.2 mm and a short side of 587.32 mm±0.2 mm.

Each of the first and second polarizing patterns may have a pitch of 0.541 mm. A phase retardation axis of the first polarizing patterns corresponding to the odd-numbered lines is different by 90° with respect to a phase retardation axis of the second polarizing patterns corresponding to the even-numbered lines.

For example, the first polarizing patterns corresponding to the odd-numbered lines may have the phase retardation axis of 45°±1.5°, and the second polarizing patterns corresponding to the even-numbered lines may have the phase retardation axis of 135°±1.5°. The ARC film 146 is provided on the tempered polarizing glass 130. The ARC film 146 may have 0.1 mm thickness.

The LCD device having the above structure according to the embodiment of the present invention displays the left image and right image through the use of liquid crystal panel 110 and tempered polarizing glass 130. Thus, the user wearing polarizing glasses may discern the 3D image displayed on the LCD device.

For example, while the left lens of the polarizing glasses uses a quarter wave plate (QWP) having an optical axis of 45° as a polarizer, the right lens of the polarizing glasses use a quarter wave plate (QWP) having an optical axis of 135°.

Hereinafter, a method for manufacturing the tempered polarizing glasses 130 to be applied to the LCD device according to the embodiment of the present invention will be described with reference to FIGS. 6 to 8.

A method for manufacturing the LCD device by manufacturing the tempered polarizing glasses 130 after manufacturing the liquid crystal panel 110 will be described with reference to FIGS. 6 to 8.

Figure 6:
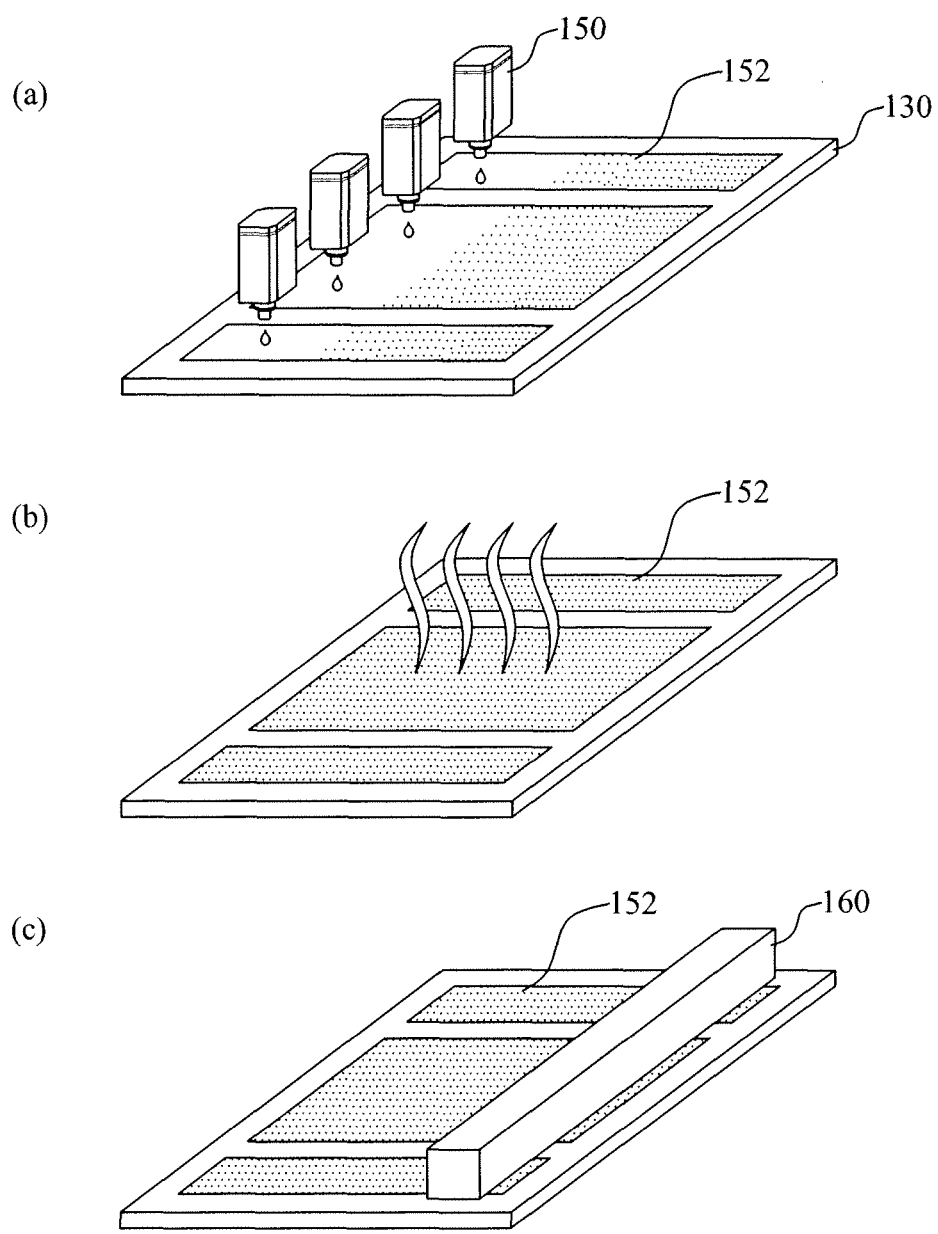
FIGS. 6 to 8 illustrate a method for manufacturing tempered polarizing glasses according to the embodiment of the present invention.

As shown in (a) of FIG. 6, an optical alignment film 152 is formed by coating a glass substrate with an optical alignment material. The optical alignment material may use a high-temperature plastic (PI) type or low-temperature plastic (non-PI) type. In this case, the optical alignment film 152 may have 500 Å-1000 Å thickness.

After that, as shown in (b) of FIG. 6, the optical alignment film 152 is heated at 120° C.~230° C., thereby plasticizing the optical alignment film 152, and removing solvent from the optical alignment film 152.

As shown in (c) of FIG. 6, in order to align polymerizable liquid crystal (Reactive Mesogen RM), the optical alignment layer 152 is aligned by an alignment apparatus 160. In this case, the alignment apparatus 160 emits ultraviolet rays (UV rays) having 300 nm~360 nm wavelength, wherein a polarization extinction ratio is more than 15:1.

The optical alignment film 152 is aligned by the use of alignment apparatus 160. For example, as shown in (a) of FIG. 8, the optical alignment film 152 is aligned at a first direction.

Figure 8:
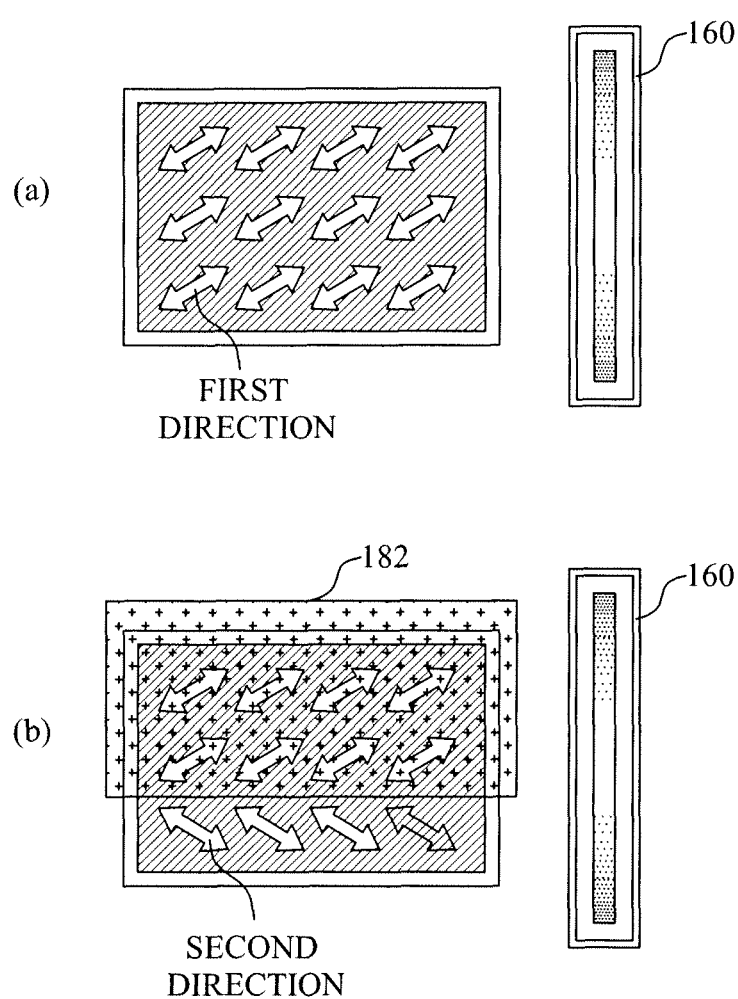

Then, as shown in (b) of FIG. 8, a predetermined portion of the optical alignment film 152 may be aligned at a second direction by the use of mask 182. In this case, the first and second directions are different by 90° from each other.

Thus, the phase retardation axes of the first and second polarizing patterns are formed to be different by 90° from each other.

The first polarizing patterns for the left image are aligned at the first direction corresponding to the odd-numbered lines of the liquid crystal panel 110. The second polarizing patterns for the right image are aligned at the second direction corresponding to the even-numbered lines of the liquid crystal panel 110.

For example, the first polarizing patterns corresponding to the odd-numbered lines have the phase retardation axis of 45°±1.5°, and the second polarizing patterns corresponding to the even-numbered lines have the phase retardation axis of 135°±1.5°.

Figure 7:
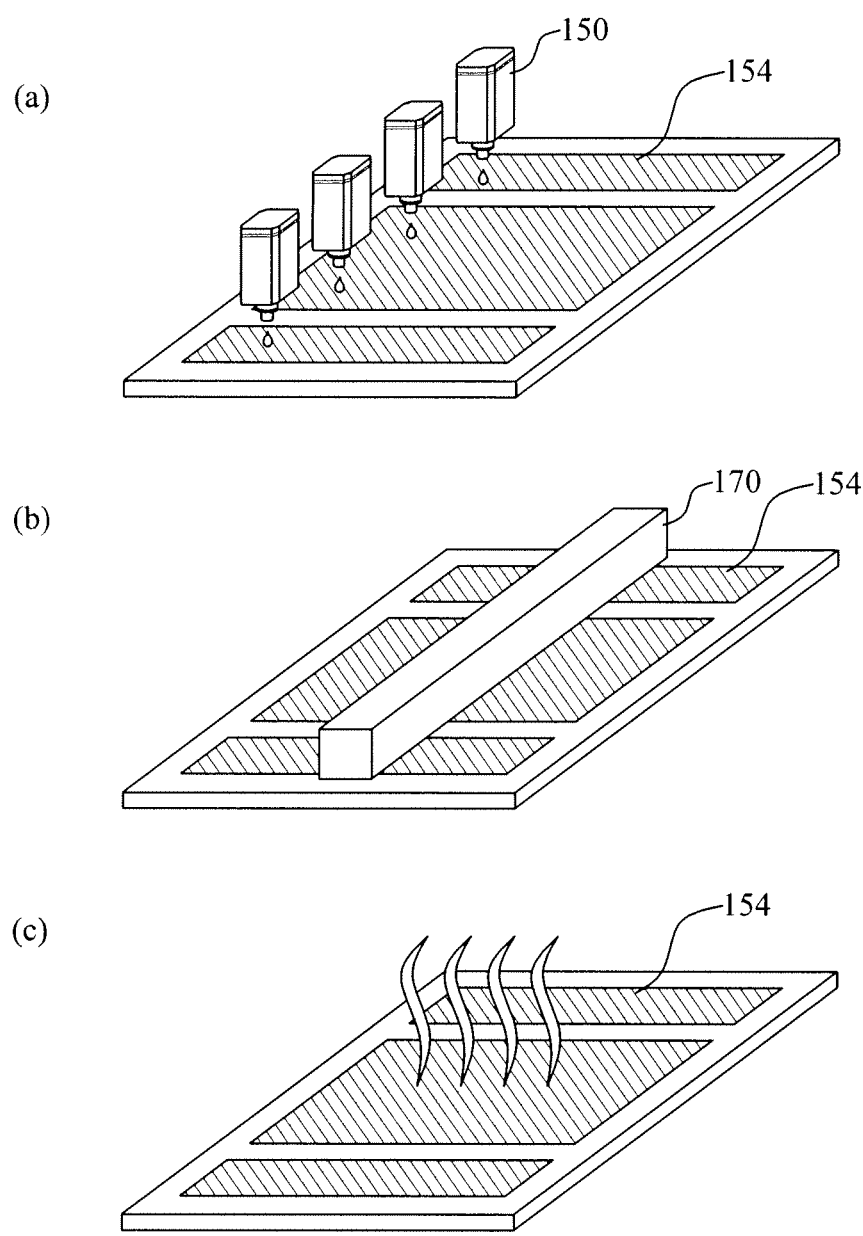

As shown in FIG. (a) of FIG. 7, a polymerizable material is coated onto the optical alignment film 152 by the use of coating apparatus 150, thereby forming a polymerizable liquid crystal film 154.

The material for the polymerizable liquid crystal film 154 may be acryl-based photo curing material. After UV curing, the polymerizable liquid crystal film 154 has 1.0 μm~1.5 μm thickness.

As shown in (b) of FIG. 7, the polymerizable liquid crystal film 154 is heated at 90° C.~150° C., and is irradiated with UV by the use of curing apparatus 170, thereby removing (drying) the solvent from the polymerizable liquid crystal film 154, and curing the polymerizable liquid crystal film by photo reaction. For the rapid curing progress in the polymerizable liquid crystal film 154, nitrogen may be supplied for the process.

As shown in (c) of FIG. 7, the polymerizable liquid crystal film 154 is heated at 150° C.~200° C., thereby removing the remaining solvent and additive.

The tempered polarizing glass 130 is manufactured by the above method of FIGS. 6 to 8.

After that, the guide panel 116 is placed on the liquid crystal panel 110.

The upper end of the bottom cover 118 is positioned on the same line as the upper surface of the upper polarizing film 114 of the liquid crystal panel 110, wherein the bottom cover covers the lateral sides of the liquid crystal panel 110.

Thereafter, the adhesive layer 132 is formed on the upper surface of the bottom cover 118 and the upper surface of the upper polarizing film 114 of the liquid crystal panel 110.

As the tempered polarizing glass 130 is adhered to the liquid crystal panel 110 by the use of adhesive layer 132.

The 3D LCD device of the borderless type with the minimized border area and step difference is manufactured by the above method.

For the above explanation, the adhesive layer 132 is formed on the upper surfaces of the bottom cover 118 and the upper polarizing film 114 of the liquid crystal panel 110, but not necessarily. According to another embodiment of the present invention, the adhesive layer 132 may be formed on the lower surface of the tempered polarizing glass 130.

The above LCD device according to the embodiment of the present invention displays the 3D image, and also satisfies the user's sense of beauty by realizing the borderless type.

Also, the LCD device according to the embodiment of the present invention displays the 3D image by the use of tempered polarizing glass, thereby manufacturing the manufacturing cost of the borderless type 3D LCD device.

In the LCD device according to the embodiment of the present invention, the liquid crystal panel 110 and the tempered polarizing glass 130 are adhered to each other without air gap, thereby preventing distortion of the light emitted from the liquid crystal panel 110, and furthermore improving picture quality of the 3D image.

Accordingly, the borderless type LCD device according to the present invention displays the 3D image.

Also, the borderless type 3D LCD device according to the present invention facilitates to reduce the manufacturing cost, to improve the picture quality of the display image, and to enhance the sense of beauty.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device comprising:
    a liquid crystal panel which includes an upper substrate for a color filter array, a lower substrate for a thin film transistor array, and a liquid crystal layer between the lower and upper substrates, wherein the lower and upper substrates are bonded to each other with the liquid crystal layer interposed therebetween, and wherein a lower polarizing film is formed on a lower surface of the liquid crystal panel, and an upper polarizing film is formed on an upper surface of the liquid crystal panel;
    a guide panel which is placed on the liquid crystal panel;
    a bottom cover which is extended to a height of an upper surface of the liquid crystal panel, the bottom cover covering lateral sides of the liquid crystal panel;
    a tempered polarizing glass which includes a plurality of polarizing patterns to circularly polarize light emitted from the liquid crystal panel leftward or rightward, the tempered polarizing glass placed on the upper surfaces of the liquid crystal panel, the upper polarizing film, and the bottom cover; and
    an adhesive layer for fixing the tempered polarizing glass to the liquid crystal panel and the bottom cover, the adhesive layer formed directly on the upper surfaces of the upper polarizing film of the liquid crystal panel and the bottom cover,
    wherein an upper end of the bottom cover is positioned to have the same height as that of an upper surface of the upper polarizing film,
    wherein the plurality of polarizing patterns of the tempered polarizing glass includes a plurality of first polarizing patterns and a plurality of second polarizing patterns, and each of the first and second polarizing patterns have a pitch of 0.541 mm,
    wherein the polarizing patterns are formed directly on a rear surface of the tempered polarizing glass.

2. The LCD device according to claim 1, wherein the liquid crystal panel and the tempered polarizing glass are adhered without an air gap therebetween by the use of adhesive layer.

3. The LCD device according to claim 1,
    wherein the liquid crystal panel is supported by the guide panel, and
    the tempered polarizing glass is supported by the liquid crystal panel and the bottom cover.

4. The LCD device according to claim 1,
    wherein the plurality of first polarizing patterns corresponding to the half of all polarizing patterns are formed corresponding to pixels of odd-numbered lines of the liquid crystal panel,
    the plurality of second polarizing patterns corresponding to the other half of all polarizing patterns are formed corresponding to pixels of even-numbered lines of the liquid crystal panel, and
    a phase retardation axis of the first polarizing patterns is different by 90° with respect to a phase retardation axis of the second polarizing patterns.

5. The LCD device according to claim 1, wherein a scattered-reflection film for preventing regular reflection of light is formed on the tempered polarizing glass.

6. A method for manufacturing an LCD device comprising:
    manufacturing a liquid crystal panel by bonding an upper substrate for a color filter array and a lower substrate for a thin film transistor array to each other with a liquid crystal layer interposed therebetween, wherein a lower polarizing film is formed on a lower surface of the liquid crystal panel, and an upper polarizing film is formed on an upper surface of the liquid crystal panel;
    after manufacturing the liquid crystal panel, manufacturing a tempered polarizing glass by forming on a glass substrate first and second polarizing patterns whose phase retardation axes are different by 90°, wherein the first and second polarizing patterns are formed by directly forming an optical alignment film on a tempered glass substrate, and aligning the optical alignment film in first and second directions, respectively;
    placing the liquid crystal panel on a guide panel, and forming a bottom cover extended to a height of an upper surface of the liquid crystal panel, the bottom cover covering lateral sides of the liquid crystal panel;
    forming an adhesive layer on upper surfaces of the liquid crystal panel and the bottom cover; and
    adhering the tempered polarizing glass and the liquid crystal panel by the use of the adhesive layer,
    wherein the tempered polarizing glass is placed on the upper surfaces of the liquid crystal panel, the upper polarizing film, and the bottom cover,
    wherein an upper end of the bottom cover is positioned to have the same height as that of an upper surface of the upper polarizing film,
    wherein each of the first and second polarizing patterns have a pitch of 0.541 mm, and
    wherein the polarizing patterns are formed directly on a rear surface of the tempered polarizing glass.

7. The method according to claim 6, further comprising forming a scattered-reflection film for preventing a regular reflection of light, the scattered-reflection film formed on the tempered polarizing glass.

8. The method according to claim 6, wherein the liquid crystal panel and the tempered polarizing glass are adhered without a gap therebetween by the use of adhesive layer.

9. The method according to claim 6, wherein the tempered polarizing glass is formed on and supported by the liquid crystal panel and the bottom cover.

10. The method according to claim 6,
    wherein first polarizing patterns corresponding to the half of all polarizing patterns are formed corresponding to pixels of odd-numbered lines of the liquid crystal panel, and
    second polarizing patterns corresponding to the other half of all polarizing patterns are formed corresponding to pixels of even-numbered lines of the liquid crystal panel.

* * * * *